July 26, 1966 A. L. ISAACS 3,263,156

STABILISED POWER SUPPLY CIRCUITS

Filed Aug. 2, 1962

INVENTOR

A. L. Isaacs

BY

F. D. Sullivan

ATTORNEY

United States Patent Office 3,263,156

Patented July 26, 1966

3,263,156
STABILISED POWER SUPPLY CIRCUITS

Anthony Leonard Isaacs, London, England, assignor to Ferguson Radio Corporation Limited, London, England, a British company Filed Aug. 2, 1962, Ser. No. 214,310
5 Claims. (Cl. 323—9)

The present invention relates to stabilised power supply circuits of which the active elements are transistors, including a series transistor in the connection between one of the input terminals (at which an unstabilised voltage is applied in operation) and one of the output terminals (at which the stabilised output is available). This latter transistor performs the regulating action, the potential drop across it being determined by that part of the circuit which senses departures in the output potential from the required value.

Under short circuit and overload conditions it is possible to draw very heavy current through the regulating transistor, with consequent damage. This is particularly the case when the open circuit loop gain is high (as is necessary if good stability is to be achieved) as this also gives a low output impedance.

According to the present invention the stabilised power supply circuit is arranged to have a stable state alternative to its normal operating state, in which alternative state the output impedance is high relative to the normal output impedance and to which the circuit switches should the load impedance fall below a certain value.

To produce the high impedance, the bias on the series transistor can be made insufficient to allow this transistor to conduct. The alternative state can be rendered stable by driving the series transistor by a driver transistor whose bias conditions are determined by the potential on the output side of the series transistor and are such, when this potential rises or falls as the case may be because the series transistor ceases to conduct, that the driver transistor maintains the non-conducting state of the series transistor.

If desired, additional circuitry responsive to the current flowing between the input and output of the power supply circuit can be arranged to switch the circuit to the alternative state when the current exceeds a predetermined value.

The invention will now be described by way of example with reference to the accompanying drawings, in which.

Figure 1:
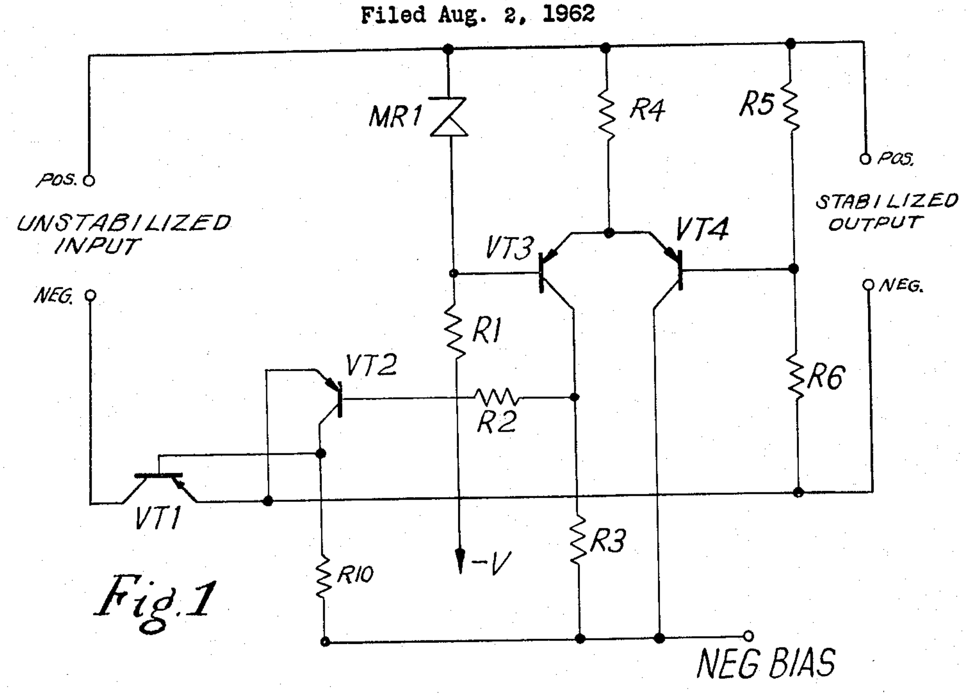
FIG. 1 is a circuit diagram of one embodiment of the invention.

A circuit diagram of a practical circuit embodying the features of the present invention is shown in FIG. 1. A series regulating transistor VT1 has its collector connected to one input terminal, its emitter connected to the emitter of transistor VT2, and its base connected to the collector of transistor VT2. The stabilised output potential is taken from the emitter of transistor VT1. The collector of transistor VT2 is connected via a load resistor R10 to a negative bias source labeled NEG. BIAS, while the base is connected via resistor R2 to the collector of transistor VT3. Transistors VT3 and VT4 are connected in a differential amplifier configuration, in which a large bias resistor R4 connects the common emitters of transistors VT3 and VT4 to the positive output terminal, with the collector electrode of VT4 connected directly to the negative bias source labeled NEG. BIAS. Resistor R3 constitutes the collector load for transistor VT3. Resistors R5 and R6 are connected in series across the circuit output terminals with the common junction of these resistors connected to the base of transistor VT4, and function as a voltage divider to apply a portion of the output signal to one input of the differential amplifier. A reference potential for the differential amplifier is provided by a Zener diode MR1 and resistor R1 connected in series between the positive output terminal and a negative potential —V.

It will be noted that the differential amplifier is not connected across the output of the circuit as is conventionally done, but, rather is connected between a positive output terminal and a source of negative bias potential, with the magnitude of the output potential being intermediate the values of the positive and negative bias potentials. Consequently, if a short circuit occurs across the output terminals, transistor VT3 saturates causing transistor VT2 to also saturate which, in turn, switches VT1 off, thereby effecting the requisite short circuit protection. Were the differential amplifier connected across the circuit output in the conventional way, a short circuit in the load would cause both of transistors VT3 and VT4 to cut off and break the operative sequence which accomplishes the short circuit isolation. The present differential amplifier configuration, therefore, provides the necessary error sensing to accomplish regulation as well as providing a necessary operative step to achieve short circuit protection.

In the normal operating condition of the circuit in FIG. 1, the proportion of the output potential at the junction of resistors R5, R6 is compared with the reference voltage across a Zener diode MR1 by a differential amplifier VT3, VT4. The amplified error voltage appears at the collector of VT3 and is further amplified by VT2. The output of VT2 is used to drive the series transistor VT1, and hence correct the output. The two stages of voltage amplification given by VT3 and VT2 provide the high open loop circuit gain necessary to achieve stability of operation.

To illustrate the operation of the circuit of FIG. 1, assume that the positive input and output terminals are at ground potential so that the circuit operates as a negative power source. If a short circuit occurs between the positive and negative output terminals, the bias voltage is removed from the base of the transistor VT4, and the base then being at ground potential, the base-emitter junction becomes reverse biased, cutting the transistor off. Since the Zener diode MR1 maintains the negative bias potential at the base of the transistor VT3, this transistor goes into saturation, so that all of its electrodes are at approximately the same negative potential. This negative potential is transmitted from the collector of VT3 via the resistor R2 to the base of the driver transistor VT2. Because of the short circuit across the output terminals, the emitter electrode of VT2 is at ground potential, so this transistor is heavily forward biased and goes into saturation, thereby placing the collector electrode of VT2 at ground potential. Since the collector of VT2 is connected directly to the base of VT1 and the emitter of VT1 is also at ground potential because of the short circuit, VT1 is rendered non-conducting, thereby preventing the flow of current in the output across the short circuit. This condition of the circuit is stable and will be maintained until action is taken to remove the short circuit across the output terminals. Once the short circuit is removed, the normal operating condition can be resumed, for example, by applying a negative pulse to the base of VT1 to again render this transistor conducting.

The voltage across the Zener diode MR1 must be sustained when the circuit switches to its short-circuit condition. The resistor R1 in series with the diode is therefore returned to a source of potential —V. The negative potential —V and the resistor R1 are selected such that the required voltage across the Zener diode MR1 is sustained when the circuit is subjected to a short circuit condition. The potential may be derived for example from the negative bias rail or from the unstabilised input.

Figure 2:
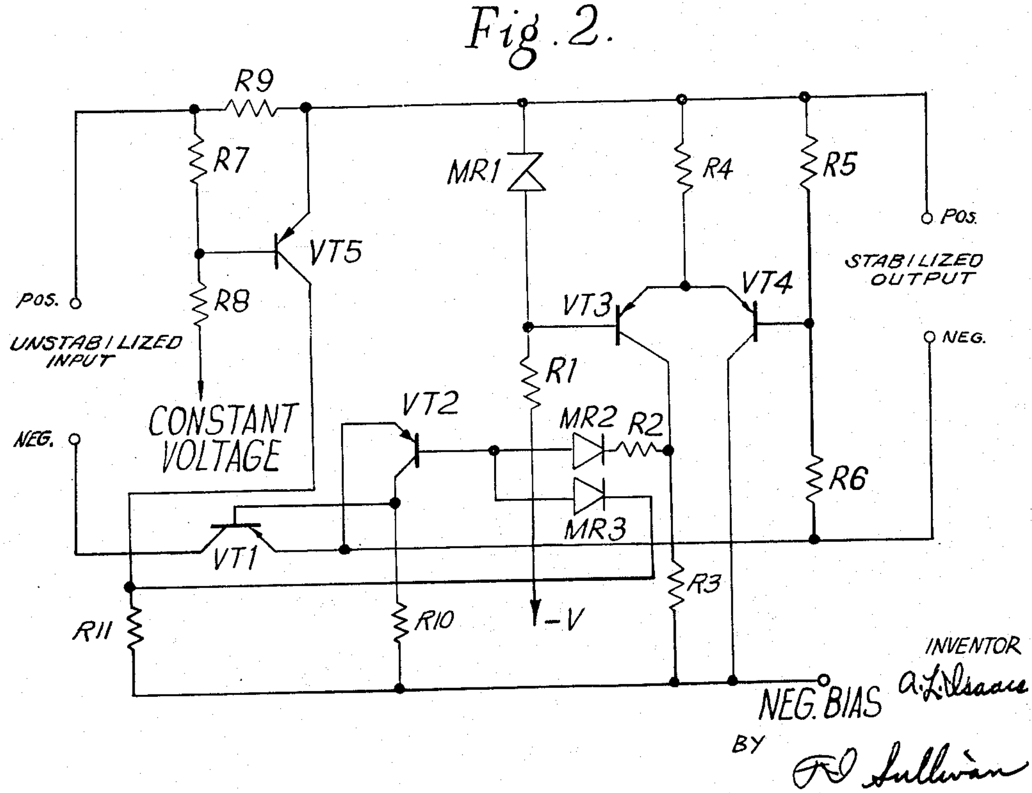
FIG. 2 shows a modification thereto.

It is evident that the circuit of FIG. 1 provides short circuit protection by switching the regulating transistor off in the presence of short circuit currents. By a refinement of this circuit, the magnitude of the current at which the circuit switches off can be controlled, a suitable means for accomplishing this result being shown in FIG. 2. Referring now to FIG. 2, the circuit is seen to be essentially the same as that of FIG. 1, but with the addition of a transistor VT5 and its associated circuitry. The base of transistor VT5 is connected to the junction of resistors R7 and R8 which form a voltage divider between the positive input terminal and a suitable source of constant voltage. The emitter is connected to the positive output terminal and the collector is connected via a resistor R11 to the NEG. BIAS source, and also via a diode MR3 to the base of transistor VT2. A bias resistor R9 is provided between the emitter of transistor VT5 and resistor R7. An additional diode MR2 is connected in series with the base of transistor VT2 and resistor R2 to isolate the base from the collector of transistor VT3 when diode MR3 is conducting.

When the circuit of FIG. 2 is operating under normal load conditions, the transistor VT5 is in a condition of saturation and its collector potential approximates the potential at the positive output terminal. As a result, the diode MR3 is reverse biased and does not conduct. When the circuit is subjected to an overload condition, the current through R9 increases and the emitter of VT5 becomes more negative. As the current through R9 increases, the base-emitter junction of VT5 becomes reverse-biased and the transistor is cut off. Therefore, the collector potential of VT5 approaches the NEG. BIAS potential via R11. This, in turn, causes MR3 to become forward biased, thereby supplying base current drive to the base of transistor VT2, causing VT2 to go into saturation. As previously described, when VT2 becomes saturated, the series transistor VT1 is rendered non-conducting and the circuit is thereby switched to a high impedance output condition. The diode MR2 isolates the base of the transistor VT2 from the collector of VT3 when MR3 is conducting.

I claim:

1. A stabilised power supply capable of protecting against excessive load current comprising, a series regulating transistor connecting the input and output circuits of said power supply, a bistable differential amplifier circuit operative in one stable state to produce error signals representative of variations in the output potential, and also operative to switch to a second stable state in response to a load current in excess of a specified magnitude, and a driver transistor operative in response to said error signals to vary the base bias on said series transistor and to cut said series transistor off when said bistable circuit switches to the second stable state.

2. A stabilised power supply capable of protecting against excessive load current comprising a series regulating transistor connecting the input and output circuits of said power supply, a driver transistor, means connecting the emitter of said series transistor to the emitter of said driver transistor, means connecting the collector of said driver transistor to the base of said series transistor and also through a resistor to a source of negative biasing potential, a pair of transistors connected in a bistable differential amplifier configuration with the common emitters of said pair of transistors being connected to a source of positive potential and the collectors being connected to a source of negative potential, a voltage divider connected across said circuit output and connected to one input of said differential amplifier, a constant voltage source including a Zener diode connected to the other input of said differential amplifier to provide a reference potential, and means connecting the output of said differential amplifier to the base of said driver transistor.

3. A stabilised power supply capable of protecting against excessive load current comprising, a series regulating transistor connecting the input and output circuits of said power supply, a driver transistor, means connecting the emitter of said series transistor to the emitter of said driver transistor, means connecting the collector of said driver transistor to the base of said series transistor and also through a resistor to a source of negative biasing potential, a pair of transistors connected in a bistable differential amplifier configuration with the common emitters of said pair of transistors being connected to a source of positive potential and the collectors being connected to a source of negative potential, a voltage divider connected across the circuit output and connected to one input of said differential amplifier, a constant voltage source including a Zener diode connected to the other input of said differential amplifier to provide a reference potential, means connecting the output of said differential amplifier to the base of said driver transistor, and a further transistor operative in response to currents in excess of a predetermined magnitude to saturate said driver transistor and render said series transistor non-conducting.

4. A stabilised power supply capable of protecting against excessive load current, said circuit comprising, first and second input terminals and first and second output terminals, a series regulating transistor connecting said first input terminal and said first output terminal, means connecting said second input terminal to said second output terminal and to a source of positive potential, a driver transistor, means connecting the emitter of said series transistor to the emitter of said driver transistor, means connecting the collector of said driver transistor to the base of said series transistor and also through a resistor to a source of negative biasing potential, a differential amplifier connected between said source of positive potential and said source of negative potential and having two input circuits and an output circuit, a voltage divider connected across said first and second output terminals and connected to one input circuit of said differential amplifier, a constant voltage source including a Zener diode connected to the other input circuit of said differential amplifier, and means connecting the output of said differential amplifier to the base of said driver transistor.

5. A stabilised power supply capable of protecting against excessive load current, said circuit comprising, first and second input terminals and first and second output terminals, a series regulating transistor connecting said first input terminal and said first output terminal, means connecting said second input terminal to said second output terminal and to a source of positive potential, a driver transistor, means connecting the emitter of said series transistor to the emitter of said driver transistor, means connecting the collector of said driver transistor to the base of said series transistor and also through a resistor to a source of negative biasing potential, a differential amplifier connected between said source of positive potential and said source of negative potential and having two input circuits and an output circuit, a voltage divider connected across said first and second output terminals and connected to one input circuit of said differential amplifier, a constant voltage source including a Zener diode connected to the other input circuit of said differential amplifier, means connecting the output of said differential amplifier to the base of said driver transistor, a further transistor connected between said source of positive potential and said source of negative potential, means for applying a portion of said load current to the base of said further transistor, and diode means connecting the collector of said further transistor to the base of said driver transistor.

References Cited by the Examiner

UNITED STATES PATENTS

| | | | |
|---|---|---|---|
| 3,040,238 | 6/1962 | Taddeo | 323—22 |
| 3,076,923 | 2/1963 | Poitras | 323—66 X |
| 3,101,442 | 8/1963 | Darbie et al. | 323—9 |
| 3,158,801 | 11/1964 | Tighe et al. | 323—22 |
| 3,199,015 | 8/1965 | Lackey et al. | 323—22 |

JOHN F. COUCH, *Primary Examiner.*

LLOYD McCOLLUM, *Examiner.*

K. W. HADLAND, H. B. KATZ, K. D. MOORE, *Assistant Examiners.*